US006212314B1

(12) United States Patent
Ford

(10) Patent No.: US 6,212,314 B1
(45) Date of Patent: Apr. 3, 2001

(54) INTEGRATED OPTO-MECHANICAL APPARATUS

(75) Inventor: Joseph Earl Ford, Monmouth, NJ (US)

(73) Assignee: Lucent Technologies, Murray Hill, NJ (US)

( * ) Notice: Subject to any disclaimer, the term of this patent is extended or adjusted under 35 U.S.C. 154(b) by 0 days.

(21) Appl. No.: 09/112,264

(22) Filed: Jul. 8, 1998

(51) Int. Cl.⁷ .................................................. G02B 6/26
(52) U.S. Cl. ................................. 385/30; 385/9; 385/10; 385/37
(58) Field of Search ................................. 385/30, 3, 2, 8, 385/9, 10, 37, 123

(56) References Cited

U.S. PATENT DOCUMENTS 5,854,864 * 12/1998 Knoesen et al. ........................ 385/30

* cited by examiner

Primary Examiner—Phan T. H. Palmer

(57) ABSTRACT

A class of opto-electronic mechanical devices that include a planar optical waveguide having a cladding in which there is carried an evanescent electric field by a light beam traveling along the waveguide and a mechanical micro-element controllably coupled into the evanescent field for varying locally the properties of the waveguide in a wavelength dependent fashion. The devices described include optical switches and WDM add/drop apparatus.

7 Claims, 3 Drawing Sheets

INTEGRATED OPTO-MECHANICAL APPARATUS

FIELD OF THE INVENTION

This invention relates to opto-mechanical electronic devices, and more particularly to a class of such devices that involves hybrid integrated micro-optic mechanics.

BACKGROUND OF THE INVENTION

Integrated optics is a well-established technology using lithography to define waveguiding paths on the surface of a planar substrate to create a variety of passive and active components. As used herein, passive components are those that route light without detection and retransmission of data signals.

Passive integrated optics devices provide robust components for power splitting, wavelength routing arid similar functions. Active integrated optics devices typically use a refractive index change from thermo- or electro-optic effects to switch light beams between optical paths.

Optomechanical components potentially provide electromechanical latching with no power dissipation. Micro-electro-mechanics is a rapidly developing field that exploits lithographic mass fabrication techniques to build miniature mechanical systems ranging in size from millimeters to microns. As used herein, a micromechanical element is a miniature element that has been shaped by lithographic patterning followed by deposition of and/or etching a workpiece, generally a multilayer structure of which several layers typically are of polysilicon. Some of the polysilicon layers are releasable by removal of intermediate sacrificial layers to form mechanical structures. Such an element is then used in a micro-electro-mechanical system (MEMS), for example in micromechanical optics. MEMS devices are available from many sources, as for example, the MEMS Technology Application Center at North Carolina (MCNC). There is now an extensive body of literature relating to such technology and its application to optical switching. Typical of such literature is a paper entitled "MEM'S the Word for Optical Beam Manipulation" published in *Circuits and Devices,* July 1997, pp. 11–18.

It is normally difficult to combine the properties of micro-mechanical optics and integrated optics in a single device because of the incompatibility of their materials and in their processing.

The present invention involves a new class of devices that are more compatible to the combining of the two technologies of micro-mechanical optics and integrated optics for use in hybrid integrated micro-opto-mechanics (HIMOM).

SUMMARY OF THE INVENTION

The basic principle of a new class of devices that use hybrid integrated micro-optics mechanics involves coupling to an optical waveguide for affecting an optical signal traveling therein through the evanescent electric field that accompanies the optical signal in the surrounding waveguide cladding as the optical signal travels along the waveguide. A basic advantage of a device that uses this approach is that it allows micro-mechanical switching and routing of the optical signal without the need for coupling the optical signal out of the waveguide, thereby increasing the efficiency and robustness of the resulting device, while lessening the need for the compatibility of the materials used for switching or waveguiding. Basically, this invention involves the movement of an element, such as a membrane, of a MEMS controllably in and out of the evanescent field of an optical signal traveling along a waveguide to affect its travel along the waveguide. Since the effect is stronger the closer the movable element is to the waveguide, for maximum effect the element should get as close as is feasible to the waveguide, typically as close as a fraction of a micron.

For an optical signal of the kind presently used in optical communication systems, the evanescent field does not extend in significant strength beyond 0.1 and 0.5 microns from the waveguide. This limited penetration into the space surrounding the waveguide would make macro-mechanical techniques ineffective in using the evanescent field for control purposes. Moreover, for maximum effect, it is advantageous to thin, in the region of interaction, the cladding that is normally used to cover the waveguide.

In a simple illustrative embodiment of the invention, a MEMS membrane is positioned adjacent a waveguide and controllably inserted in and out of the evanescent field of an optical signal traveling along the waveguide for scattering the optical signal and attenuating desirably further travel along the waveguide.

In another illustrative embodiment of the invention, a waveguide interferometer switch, a section of a MEMS that is readily deformable electromechanically is moved in, from out of, near contact with a selected one of two arms of a Mach-Zender interferometer so that then there is evanescent coupling by such arm with the guided mode in the dielectric cladding surrounding the waveguide. This coupling changes the effective index of refraction, and therefore the optical length, of the affected arm. Such a change affects the relative phase of the light waves in the two arms and produces an unequal division of the power of the light wave between the two output ports of the interferometer.

In another illustrative embodiment, a device that adds or drops selectively a wavelength channel in a wavelength multiplex division (WDM) system uses evanescent coupling to modify the reflective properties of MEMS optical gratings to add or drop a channel of a particular wavelength from a group of signal channels of different wavelengths.

In some instances, the MEMS element may even serve to provide some waveguiding.

The invention will be better understood from the following detailed description taken in conjunction with the accompanying drawing.

BRIEF DESCRIPTION OF THE DRAWING

Each of FIGS. 1 through 5 depicts a different illustrative embodiment of micro-electronic mechanic devices that use coupling to the evanescent field surrounding a planar waveguide to control light beams traveling in the waveguide.

DETAILED DESCRIPTION

Figure 1:
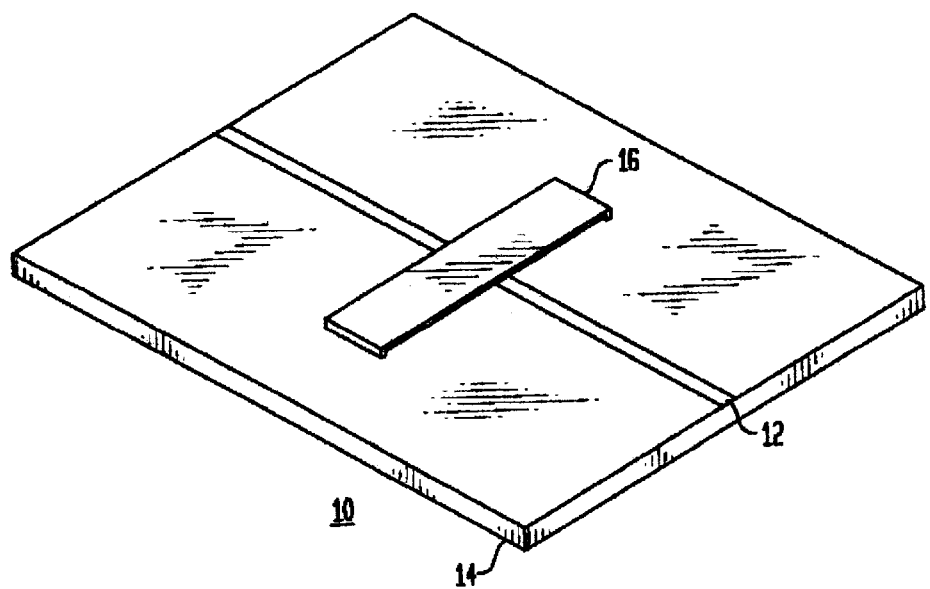

FIG. 1 illustrates a particular arrangement 10 for attenuating controllably an optical signal traveling along a planar waveguide 12 on a planar substrate 14. A MEMS in which there has been formed a suspended deformable polysilicon portion of a MEMS, such as a suspended membrane 16, is positioned over the waveguide 12. By application of a force advantageously electrostatic, to deform the membrane 16 in and out of the region of the evanescent field of the signal traveling in a waveguide, the signal is scattered, thereby attenuating it. The force can be provided by a voltage between the membrane and the planar substrate 14 supporting the waveguide 12 since these typically are each of silicon. The attenuation can be made sufficiently strong, if desired, essentially to cut off further travel. Advantageously, the cladding (not shown separately) normally covering the waveguide is thinned or removed in the region of coupling to the membrane 16. Alternatively, there may be used a segment of a higher index cladding to decrease the index discontinuity and to confine the light wave tightly to the waveguide to increase the sensitivity of the interaction.

Figure 2:
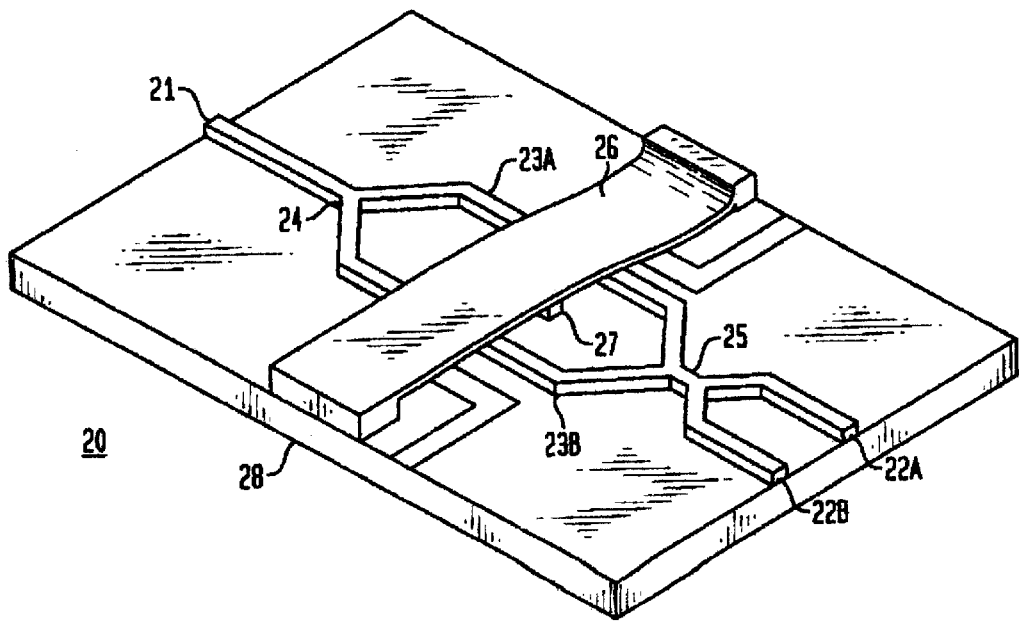

FIG. 2 shows a Mach-Zender waveguide interferometer 20 that comprises an input port waveguide section 21 and a pair of output port waveguide sections 22A and 22B supported on a planar substrate 27. Between these waveguide sections is positioned a pair of interferometer arms 23A, 23B of equal length that branch apart from their junction 24 with the input port section 21 and join together at junction 25 before branching into the output port sections 22A, 22B. A deformable element of a MEMS, such as membrane 26, advantageously of the kind earlier described, is supported over the interferometer arms at its opposite ends and at an intermediate post 27. By deflecting electromechanically in any suitable controllable fashion a selected one of the two halves of the membrane 26 on either side of support port 16C into the region of strong evanescent field of a light beam traveling along the underlying arm of the interferometer, there is changed the relative phase of the light waves in the separate arms. Accordingly, when the two beams recombine at the output junction 25, because of interference effects the relative difference in phase will result in an uneven split of the combined light, as it exits via the separate output ports 22A, 22B. Depending on the amount of the relative phase shift introduced, almost complete transfer of the light power to a selected one of the two output ports is feasible. It can be seen that additional paths can be provided between the junctions 24 and 25 and a MEMS element used to affect the optical signal in such path in the manner described.

It is to be noted that this switching is effected without interrupting the travel of the light beam in either arm from its normal path or mechanically disturbing the waveguide paths, so that the resultant device can be rugged and relatively lossless. Moreover, both the MEMS including deformable member 26 and the interferometer 20 can be fabricated independently on separate substrates and later assembled together with little disturbance of either.

Figure 3:
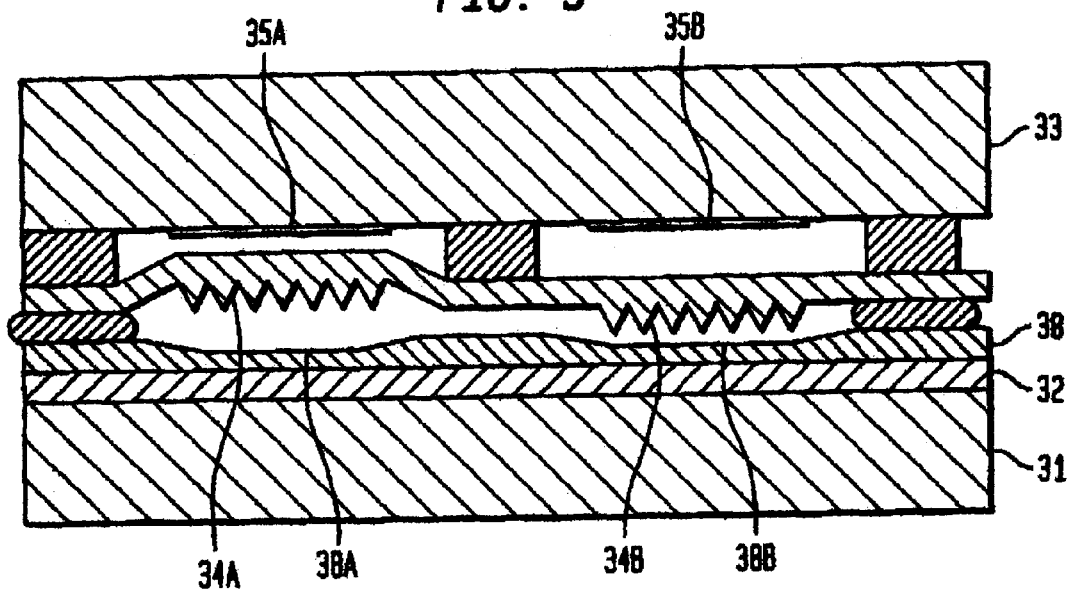

FIG. 3 illustrates a HIMOM wavelength channel selectable add/drop assembly 30 for use in a wavelength division multiplexing (WDM) system. It includes a planar substrate 31 that supports a planar waveguide 32 along which is traveling a multiwave-length optical signal. Over the substrate 31 is positioned a MEMS 33 that includes a sawtooth element that includes, by way of example, a pair of relatively thick sawtooth grating sections 34A, 34B formed of a polysilicon layer. Typically such a grating can be a surface profile or index variation written by ultra violet light. These are supported suitably over the waveguide 32 by posts shown but not numbered. Each diffraction grating is controlled by a separate one of conductive electrodes 35A, 35B in the MEM 33 so that either grating can be moved in or out of the region of strong evanescent field of the signal traveling in the waveguide 32. Advantageously, to facilitate this the thickness of the waveguide cladding 38 is reduced at regions 38A, 38B adjacent to the gratings. By appropriate choice of the spacing of the grating teeth, each grating 34A, 34B can be made to reflect selectively a particular channel wavelength when the grating is moved into the evanescent field at a region of thinned waveguide cladding. A sequence of grating sections, each with different teeth spacing to be reflective of a different wavelength, of which only two gratings are shown in FIG. 3, can be spaced along the waveguide to reflect a selected one of the multichannel wavelengths, as the appropriate grating is moved into the evanescent field. The reflected light going backwards can be selectively recovered in known fashion by the use of an optical circulator, positioned to pass such reflected light into a side port, while passing forward traveling beams to an output port.

If preferred, it is possible to get the effect of a thick grating from a sequence of relatively thin periodic structures provided the segments of the periodic structure are appropriately spaced to maintain coherence. For example, the selectivity of a 10 mm thick grating can be achieved with 10 100-micron-thick segments placed at 900 micron intervals.

A grating could be added to the MEMS membrane 16 in the switch of FIG. 1 to increase its scattering and switching action.

Figure 4:
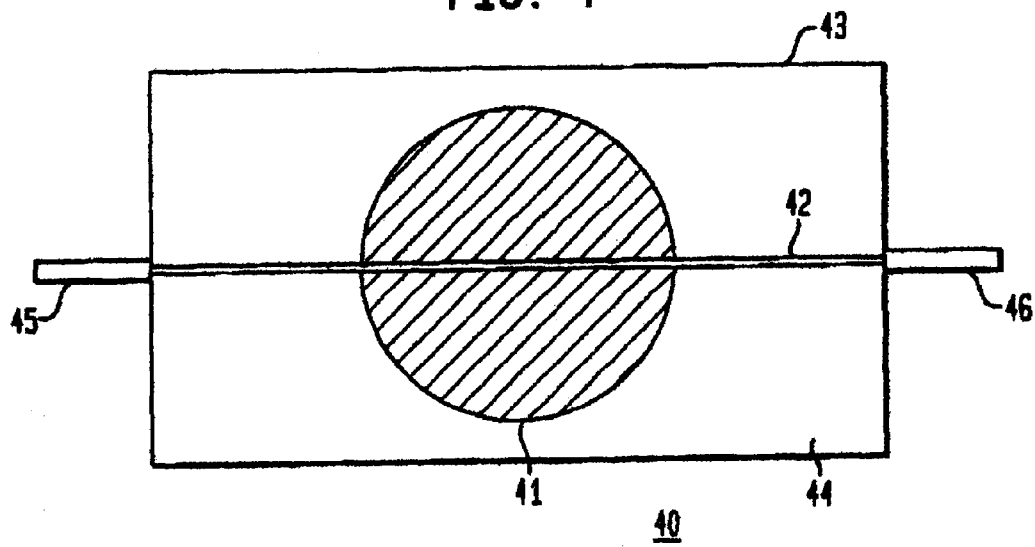

In FIG. 4 there is shown in top view apparatus 40 that includes a MEMS that includes a grating structure 41 that can be used in an analogous fashion to that shown in FIG. 3 as a WDM add/drop assembly to reflect selectively a light beam of a chosen wavelength from a multiwavelength beam. The grating structure 41 is positioned over an intermediate section of the integrated optic waveguide 42 on substrate 44, and is rotatable. Its undersurface (not seen) is provided with parallel lines of sawteeth to form a grating shown as though they were on the upper surface that is seen in the figure. Optical fiber couplers 45, 46 are provided at the opposite ends of the planar waveguide 42 to serve as the input and output ports. The rotatable member 41 is supported closely over the intermediate section of the waveguide such that the sawteeth extend into the evanescent field of the waveguide. The waveguide cladding, not shown, is thinned in the region underlying the grating structure to increase the evanescent field available. By rotating the grating 41 to vary the angle the lines of teeth form with the underlying waveguide, there is varied the reflective effect of the grating. For a thin waveguide structure, the rotated grating has an apparent period that varies as the sign of the rotation angle. A tunable add/drop effect results by rotating the grating to the appropriate angle for the desired wavelength. If no reflection is desired, the grating can be rotated to a position where the wave path is little affected. Here again optical circulators adjacent at the input and output ports can be used in standard fashion to divert appropriately the added and/or dropped signals.

Alternatively, in the preceding arrangement the gratings can be used to scatter selectively the light of a particular wavelength whereby such light is effectively attenuated so that there is formed a wavelength-dependent attenuator. As mentioned earlier, the attenuation can be sufficiently large that light of the selected wavelength is essentially eliminated from the traveling signal.

Figure 5:
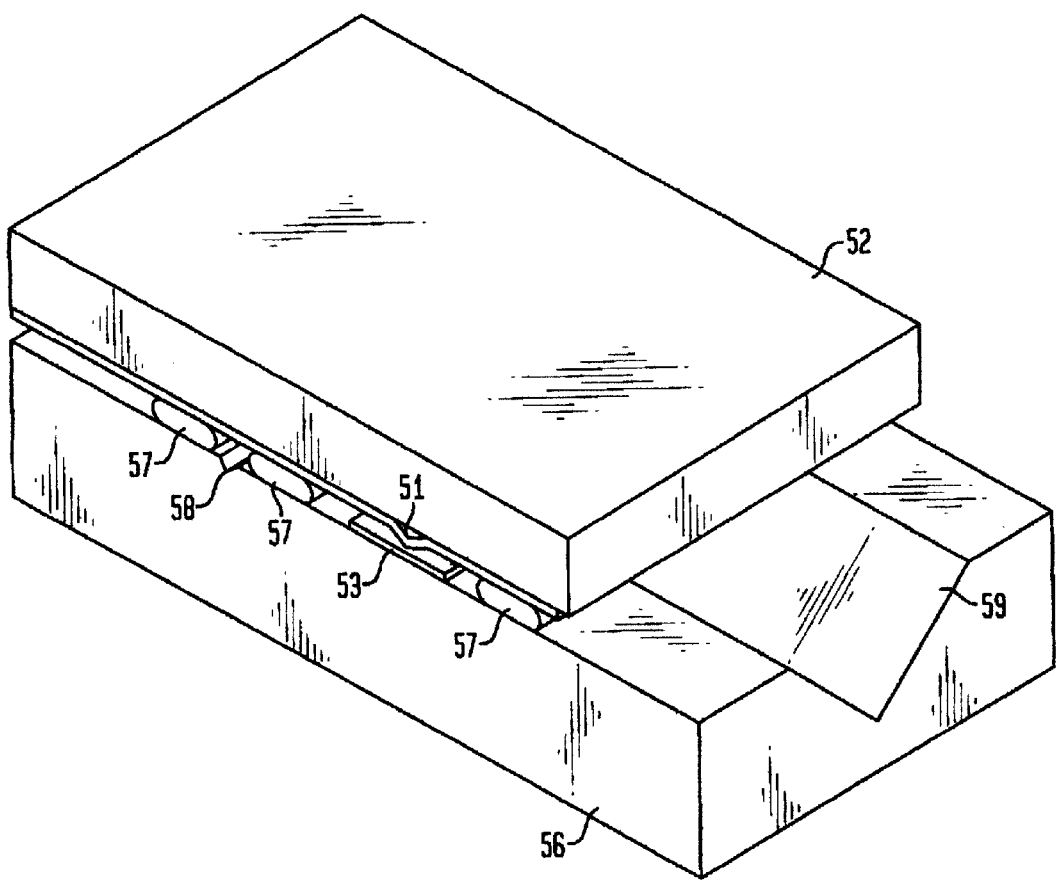

Hybrid integrated micro-optic-mechanics can be implemented with the MEMS element and the waveguide structure either bonded together on the same substrate. As shown in FIG. 5, a waveguide 51 is formed on the underside of the planar surface of a suitable substrate 52, such as a crystalline silicon or lithium niobate chip. In the drawing, the waveguide extends essentially perpendicular to the plane of the drawing. Then MEMS elements 53 are included, either formed in layers, for example, of polysilicon deposited over the original waveguide substrate, or as shown in FIG. 5 in a separate planar silicon micromechanical substrate chip 56 that is bonded to the original substrate waveguide chip, for example, by the conventional flip-chip bonding technique used in silicon integrated circuit technology. In this latter case, the spacing between the two chips 52, 56 to have the MEMS element 53 positioned to affect the evanescent field of a lightwave in the waveguide can be controlled by the height of the solder bumps 57 used to bond together the two chips. If desired, the spacing may be made closer than the height of the solder bumps by recessing the bump sites. Integrated optics chips are usually cleaved to obtain clean edge surfaces, before being coupled to optical fibers. To simplify fiber-to-waveguide alignment, it is now know to use etched silicon substrates as templates. In analogous fashion, the micromechanical substrate may be cleaved to provide fiber alignment features as shown in FIG. 5 at 58 and 59. In a copending application filed on Jun. 1, 1998 (Aksyuk et al. 10-2-17-18-16) and assigned to the same assignee as the instant application, there are described hybrid systems, in which a silicon chip including optical and/or electronic elements is flip-chip bonded to a MEMS substrate.

It is also feasible to flip-chip bond entire wafers and then to saw the bonded wavers into individual dice or chips. In such a case, it would be advantageous to etch or score features into the separate wafers before the bonding. However it may be difficult to saw a chip that includes an integrated optics waveguide substrate. However, by proper preparation and choice of the waveguide substrate, it should be possible to cleave such a substrate without damage to the waveguide by scoring appropriately the waveguide optics substrate and then cleaving the bonded pair.

From the above examples, it should be apparent that HIMOM technology has a versatility that adapts it for use in a variety of devices that use mechanical elements to control opto-electronic devices by close coupling to the evanescent field surrounding a planar waveguide with no direct disturbance of the waveguide.

What is claimed is:

1. Apparatus comprising:

means providing an optical signal in a waveguide that is characterized by a region surrounding the path of the light that includes the evanescent field of the light;

MEMS means including a grating for affecting the optical signal traveling along the waveguide; and means for controllably inserting the affecting means in or out of the region of the evanescent field of the optical signal traveling along the waveguide, for affecting desired changes in the optical signal in a wavelength dependent fashion.

2. Apparatus in accordance with claim 1 in which the affecting means is a sequence of gratings, each reflective at a different wavelength for affecting selectively power of said wavelength in the optical signal.

3. Apparatus in accordance with claim 1 in which the providing means provides a waveguide path that includes at least one input port, at least two output ports, and an intermediate region therebetween that includes a plurality of paths that are joined together at their input and output ends, the input ends being connected to at least one input port, and their output ends being connected to the different output ports, and the means for inserting inserts the light affecting means to a different degree in the evanescent fields surrounding the plurality of paths whereby an optical signal supplied to the input port of the waveguide may be made to divide in a desired fashion between the output ports.

4. Apparatus in accordance with claim 3 in which the affecting means is a deformable MEMS element that includes separate portions each overlying a separate one of the plurality of paths such that each portion can be separately inserted into the evanescent field of the optical signal in its adjacent path.

5. Apparatus in accordance with claim 1 in which the affecting means is a rotatable grating positioned over the path of the optical signal in its evanescent field, whereby the rotation of the grating can be used to change, in a wavelength dependent manner, the affecting properties of the grating.

6. Apparatus in accordance with claim 5 in which the rotation of the grating can be used to remove wave energy of a selected wavelength from forward travel in the wave path.

7. The method of affecting an optical signal traveling along a waveguide that comprises positioning a MEMS that includes a deformable control element including a grating adjacent the waveguide, and controllably deforming the deformable element in and out of the evanescent field of the optical signal traveling along the waveguide whereby the optical signal is affected in a wavelength dependent fashion.

* * * * *